United States Patent [19]
Nakagawa et al.

[11] Patent Number: 5,323,668
[45] Date of Patent: Jun. 28, 1994

[54] APPARATUS FOR REGULATING VEHICLE TRANSMISSION LINE PRESSURE BASED ON THROTTLE OPENING OR ENGINE INTAKE AIR QUANTITY

[75] Inventors: Norihisa Nakagawa, Numazu; Hiroki Matsuoka; Yasunori Nakawaki, both of Susono, all of Japan

[73] Assignee: Toyota Jidosha Kabushiki Kaisha, Toyota, Japan

[21] Appl. No.: 972,516

[22] Filed: Nov. 6, 1992

[30] Foreign Application Priority Data

Nov. 8, 1991 [JP] Japan ................................ 3-321204

[51] Int. Cl.$^5$ ............................................ B60K 41/06
[52] U.S. Cl. .................. 477/163; 364/424.1; 477/158; 477/905
[58] Field of Search ............... 74/866; 364/424.1

[56] References Cited

U.S. PATENT DOCUMENTS

| | | | |
|---|---|---|---|
| 4,220,059 | 9/1980 | Mizuno | 74/866 X |
| 4,691,285 | 9/1987 | Takeda | 364/424.1 X |
| 4,739,483 | 4/1988 | Ina et al. | |
| 4,833,612 | 5/1989 | Okuno et al. | 364/424.1 X |
| 5,003,950 | 4/1991 | Kato et al. | |
| 5,081,887 | 1/1992 | Kato | 74/866 OR |
| 5,266,351 | 7/1993 | Matsuoka et al. | 74/866 OR |

FOREIGN PATENT DOCUMENTS

| | | |
|---|---|---|
| 48-70230 | 9/1973 | Japan . |
| 61-248949 | 11/1986 | Japan . |
| 169946 | 5/1989 | Japan . |
| 1279151 | 11/1989 | Japan . |
| 245062 | 10/1990 | Japan . |
| 314960 | 1/1991 | Japan . |

Primary Examiner—Leslie A. Braun
Assistant Examiner—Daniel Wittels
Attorney, Agent, or Firm—Oblon, Spivak, McClelland, Maier & Neustadt

[57] ABSTRACT

A hydraulic control apparatus for an automatic transmission of a motor vehicle, which has a plurality of gear positions that are selectively established by selective operation of hydraulically operated frictional coupling devices. The apparatus includes a pressure regulating device which receives a hydraulic pressure generated by a pressure source and generates a line pressure to be applied to the coupling devices. The pressure regulating device regulates the line pressure on the basis of the detected throttle opening angle of the engine when the vehicle is running in a transient state, and on the basis of the detected intake air quantity of the engine when the vehicle is running in a steady state.

7 Claims, 7 Drawing Sheets

FIG. 2

|  | C1 | C2 | C0 | B0 | B1 | B2 | B3 |
|---|---|---|---|---|---|---|---|
| 1ST | ○ |  | ○ |  |  |  | △ |
| 2ND | ○ |  | ○ |  | △ | ○ |  |
| 3RD | ○ | ○ | ○ |  |  | ○ |  |
| O/D | ○ | ○ |  | ○ |  | ○ |  |
| REV |  | ○ | ○ |  |  |  | ○ |

APPARATUS FOR REGULATING VEHICLE TRANSMISSION LINE PRESSURE BASED ON THROTTLE OPENING OR ENGINE INTAKE AIR QUANTITY

BACKGROUND OF THE INVENTION

1. Field of the Invention

The present invention relates generally to a hydraulic control apparatus for a hydraulically-operated automatic transmission of a motor vehicle, and more particularly to such a hydraulic control apparatus for regulating the line pressure used to shift the transmission.

2. Discussion of the Prior Art

For a motor vehicle, there is widely known an automatic transmission which uses a plurality of hydraulically operated frictional coupling devices such as multiple-disk clutches and band brakes. A hydraulic circuit including a pressure source which generates a hydraulic pressure is provided to selectively operate the frictional coupling devices and thereby establish a suitable one of a plurality of operating positions (speed or gear positions) of the transmission. If the line pressure to be applied to the frictional coupling devices is excessively low, the frictional coupling devices tend to easily slip, leading to seizure or rapid wearing of the coupling members of the devices. If the line pressure is excessively high, the frictional coupling devices tend to undergo abrupt engaging actions, resulting in undesirable shifting of the transmission with a large shifting shock. The excessively high line pressure requires a relatively long operating time of a hydraulic pump of the hydraulic pressure source, which means a large amount of energy consumption or loss. In the light of these drawbacks, the line pressure for the transmission is generally regulated so as to be at a required minimum level, depending upon the amount of torque that should be transmitted through the transmission, namely, depending upon the angle of opening of a throttle valve which represents the current load of the vehicle engine whose output is transmitted to the drive wheels of the vehicle through the transmission. An example of such hydraulic control apparatus adapted to regulate the line pressure as described above is disclosed in JP-A-61-248949 (laid-open publication of unexamined Japanese Patent Application).

The present applicants recognized a drawback in the known hydraulic control apparatus adapted to regulate the line pressure depending upon the throttle opening of the engine. Namely, the throttle opening which has been used as a parameter representative of the engine load does not actually reflect the engine load with high precision, on motor vehicles of modern vintage which are equipped with various adjusting devices or mechanisms for improving fuel economy of the engine or optimizing output characteristics of the engine under varying running condition of the vehicle. Those adjusting devices or mechanisms include: mechanism for changing the operating timing of the intake and exhaust valves of the engine; mechanism for changing the idling speed of the engine; and exhaust gas recirculating valve (EGR valve) for recirculating the exhaust emission back to the air intake system. The engine load may change due to a change in the intake air quantity, even with the same throttle opening, depending upon the atmospheric pressure which varies with the altitude.

On the other hand, the line pressure can be suitably regulated without an influence of the adjusting devices or mechanisms and the altitude, when the line pressure regulation is based on the intake air quantity of the engine which is actually detected. However, a change in the intake air quantity is delayed with respect to a change in the throttle opening, when the vehicle is accelerated or otherwise in a transient running state. This delay may cause the line pressure to be temporarily lower than required. When the torque to be transmitted through the transmission (transmission torque) is increased during acceleration of the vehicle, the line pressure should be increased before the increase of the transmission torque. That is, an increase in the line pressure after an increase in the actual engine load (transmission torque) does not assure optimum line pressure for transmitting the increased torque.

SUMMARY OF THE INVENTION

It is therefore an object of the present invention to provide a hydraulic control apparatus capable of suitably regulating the line pressure for a hydraulically operated automatic transmission of a motor vehicle, with a high response even in a transient running state of the vehicle, without an influence of the adjusting devices or mechanisms described above.

The above object may be achieved according to the principle of the present invention, which provides a hydraulic control apparatus for an automatic transmission of a motor vehicle with an engine having a throttle valve, the transmission including a plurality of hydraulically operated frictional coupling devices which are selectively operated to establish one of a plurality of operating positions of the transmission, the apparatus comprising: (a) pressure source for generating a hydraulic pressure; (b) first detecting means for detecting an opening angle of the throttle valve; (c) second detecting means for detecting an intake air quantity admitted into the engine; (d) determining means for determining whether the vehicle is running in a steady state or in a transient state; and (e) pressure regulating means receiving the hydraulic pressure and generating a line pressure to be applied to the frictional coupling devices. The pressure regulating means regulating the line pressure on the basis of the opening angle of the throttle valve of the engine when the determining means determines that the vehicle is running in the transient state. When the determining means determines that the vehicle is running in the steady state, the pressure regulating means regulates the line pressure on the basis of the intake air quantity of the engine.

In the hydraulic control apparatus of the present invention constructed as described above, the pressure regulating means regulates the line pressure on the basis of the throttle opening angle detected by the first detecting means, when the determining means determines that the vehicle is in the transient running state, and on the basis of the intake air quantity of the engine detected by the second detecting means, when the determining means determines that the vehicle is in the steady running state. In the steady running state of the vehicle with the throttle valve opening being held substantially constant, the intake air quantity used to determine the line pressure accurately reflects the actual load on the engine, and is not influenced by the altitude of the vehicle or by the operating states of the adjusting mechanisms such as the mechanism for changing the idling speed of the engine. Thus, in the steady running state, the line pressure can be regulated to an optimum level which corresponds to the actual engine load. In the transient running state of the vehicle with a considerably high rate of change in the throttle opening angle, the line pressure is determined based on the throttle opening angle, which changes before the torque applied to the transmission changes. This arrangement permits the line pressure to be increased before a change in the torque actually applied to the transmission, whereby the relatively large torque can be transmitted through the transmission, with the appropriate frictional coupling devices operated under a sufficiently high level of the line pressure.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which:

FIG. 2 is a view indicating the operating states of clutches and brakes of the transmission for selectively establishing different speed positions;

DETAILED DESCRIPTION OF PREFERRED EMBODIMENT

Figure 1:
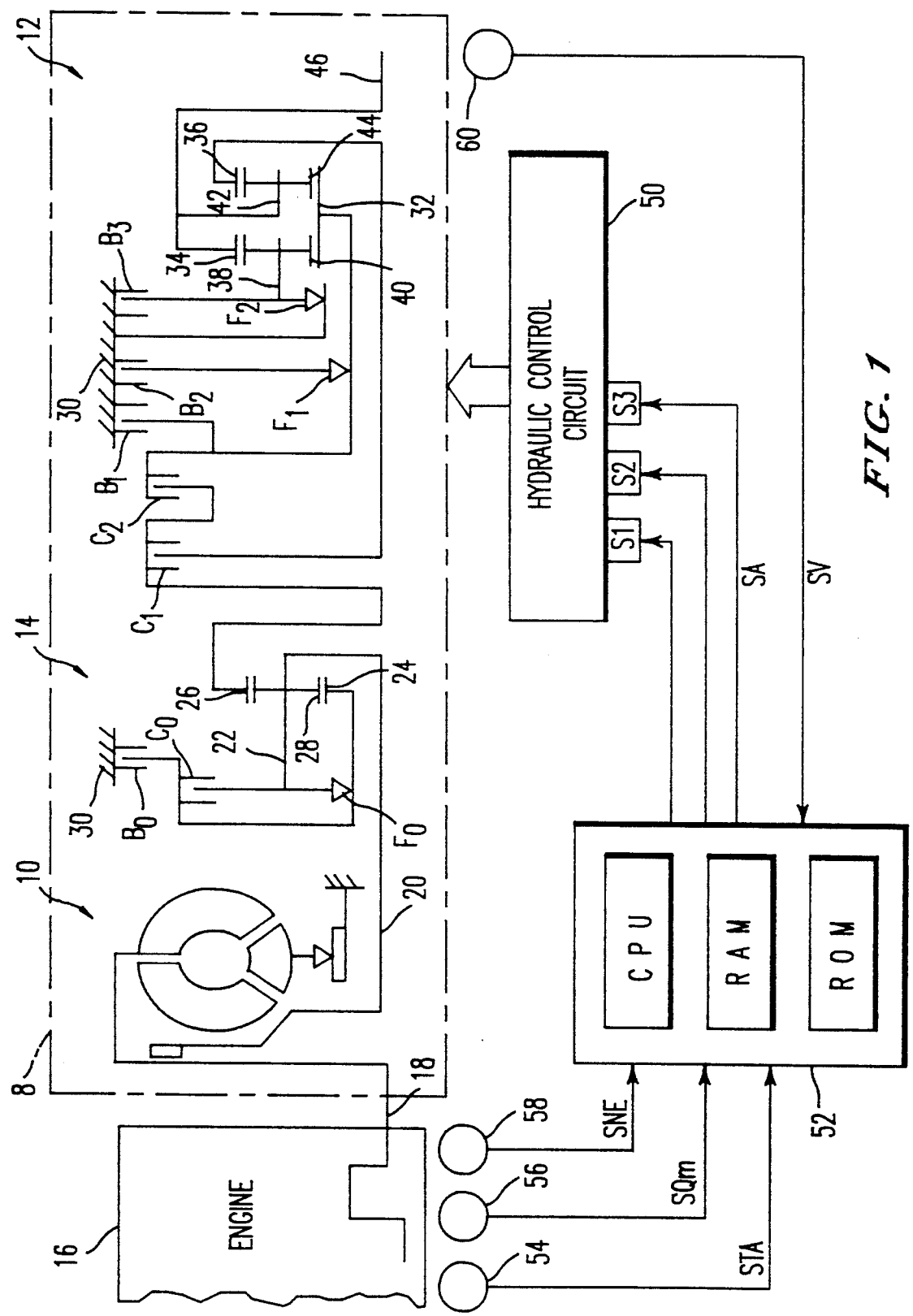
FIG. 1 is a schematic view showing an automatic transmission of a motor vehicle, and a control system which incorporates one embodiment of a hydraulic control apparatus for regulating a line pressure for controlling the transmission.

Referring first to FIG. 1, there are shown an automatic transmission 8 of a motor vehicle, and a control system for the transmission 8. The vehicle has an engine 16 connected to the automatic transmission 8 through a crankshaft 18. The transmission 8 includes a torque converter 10, a first planetary gear assembly 12 and a second planetary gear assembly 14. The torque converter 10 has a pump impeller connected to the crankshaft 18 of the engine 16, and a turbine impeller connected to a carrier 22 of the second planetary gear assembly 14 through an input shaft 20. The second planetary gear assembly 14 has a planetary gear set including the carrier 22, a sun gear 24, a ring gear 26, and a planetary gear 25 which is rotatably supported by the carrier 22 and which meshes with the sun gear 24 and the ring gear 26. Between the sun gear 24 and the carrier 22, there are disposed in parallel a clutch C0 and a one-way clutch F0. A brake B0 is disposed between the sun gear 24 and a housing 30 of the transmission 8. When power is transmitted from the engine 16 toward the transmission 8, the one-way clutch F0 provided between the sun gear 24 and the carrier 22 assures the same operating state irrespective of the operating state (engaged or disengaged state) of the clutch C0.

The first planetary gear assembly 12 has a composite type planetary gear unit including: a sun gear 32; a pair of ring gears 34, 36; a carrier 38; a planetary gear 40 which is rotatably supported by the carrier 38 and meshes with the sun gear 32 and the ring gear 36; a carrier 42; and a planetary gear 44 which is rotatably supported by the carrier 42 and meshes with the sun gear 32 and the ring gear 36. Between the ring gear 36 of the first planetary gear assembly 12 and the ring gear 26 of the second planetary gear assembly 14, there is disposed a clutch C1. Between the sun gear 32 of the first planetary gear assembly 12 and the ring gear 26 of the second planetary gear assembly 14, there is disposed a clutch C2. Between the sun gear 32 and the housing 30, there are disposed in parallel a brake B1, and a combination of a one-way clutch F1 and a brake B2 which are disposed in series. Between the carrier 38 and the housing 30, there are disposed in parallel a brake B3 and a one-way clutch F1. The ring gear 34 and the carrier 42 are fixed with an output shaft 46 so that these elements 34, 42, 46 are rotated as a unit. The output shaft 46 is connected to drive wheels of the vehicle through a differential gear device and other elements of the power transmitting system of the vehicle.

Figure 2:
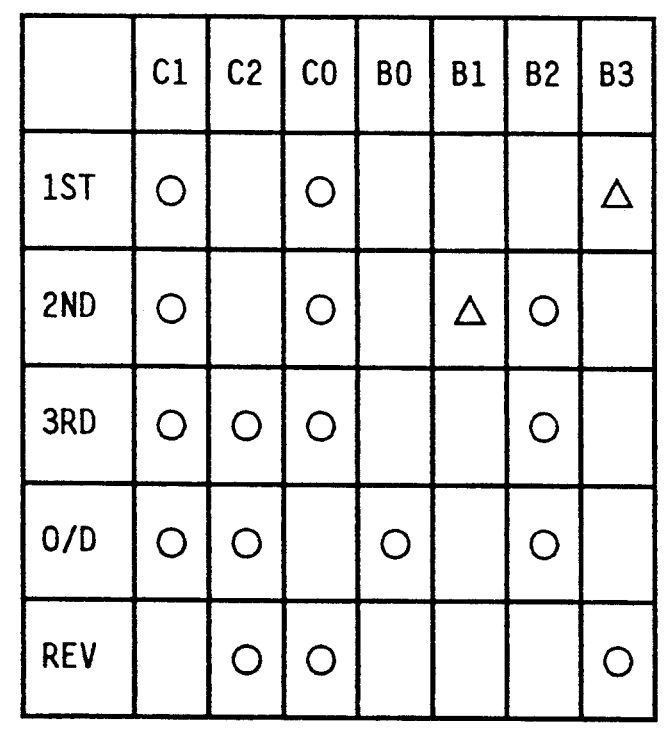
Figure 4:
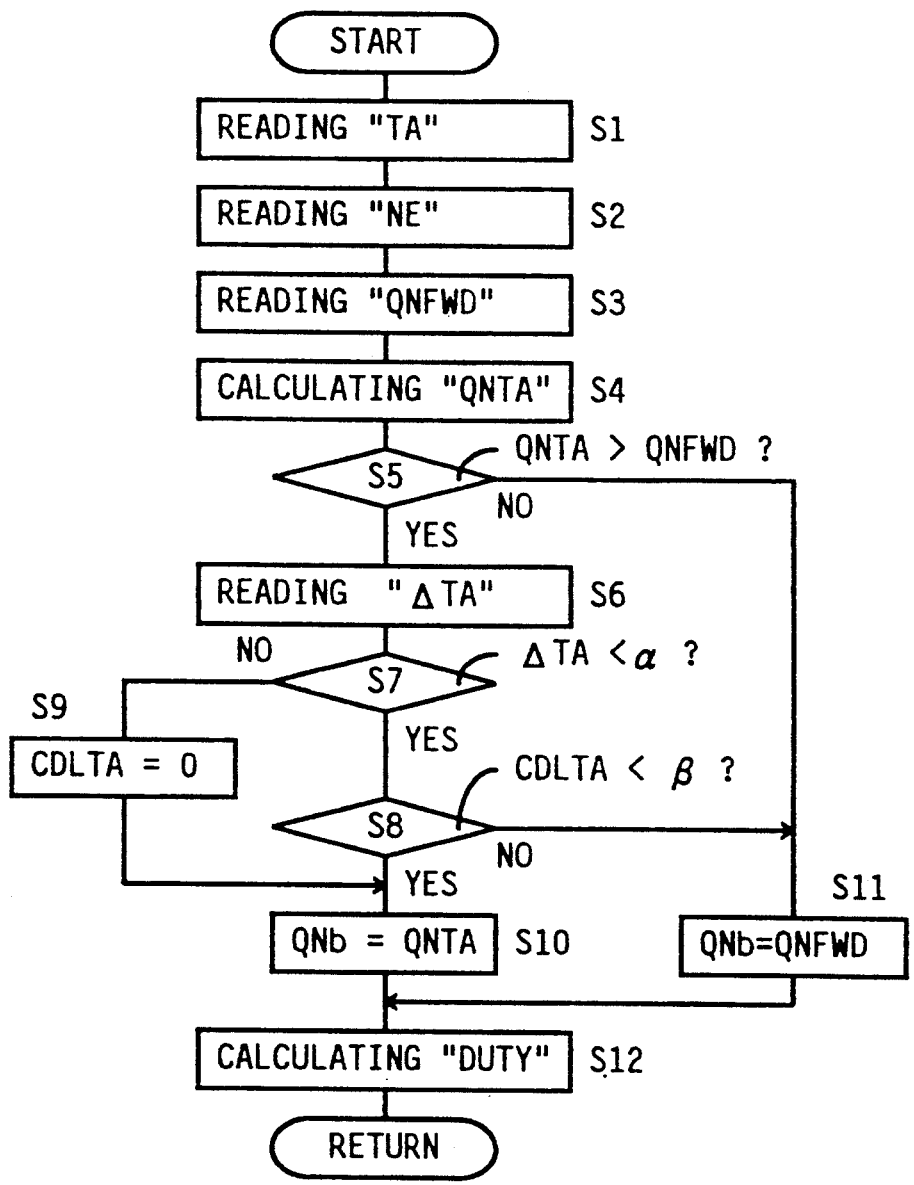
FIG. 4 is a flow chart illustrating a control routine for regulating the line pressure.

The clutches C0, C1 and C2 (generally referred to as "clutches C") and the brakes (generally referred to as "brakes B") are multiple-disk clutches and band brakes, respectively, which are frictional coupling devices actuated by respective hydraulic actuators as well known in the art. The hydraulic actuators are supplied with a pressurized fluid fed from a hydraulic control circuit 50. This circuit 50 has control valves for selectively operating the hydraulic actuators, for selective engaging actions of the clutches C and brakes B to establish one of four forward drive positions of the transmission 8, namely, 1st-speed position (1st), 2nd-speed position (2nd), 3rd-speed position (3rd) and overdrive position (O/D), as indicated in the table of FIG. 2. The control valves are controlled according to a currently established one of four combinations of the operating states (energized or de-energized state) of two solenoid coils S1 and S2. In the table of FIG. 4, "o" marks indicate the engaged state of the clutches C and brakes B, while "Δ" marks indicate the engagement of the brakes B1, B3 when the vehicle is running in an engine braking mode, with power being transmitted from the drive wheels to the engine 16. The transmission 8 has a reverse drive position (Rev), which is established by operation of a manual shift valve upon operation of a shift lever to the appropriate reverse position (R).

Figure 3:
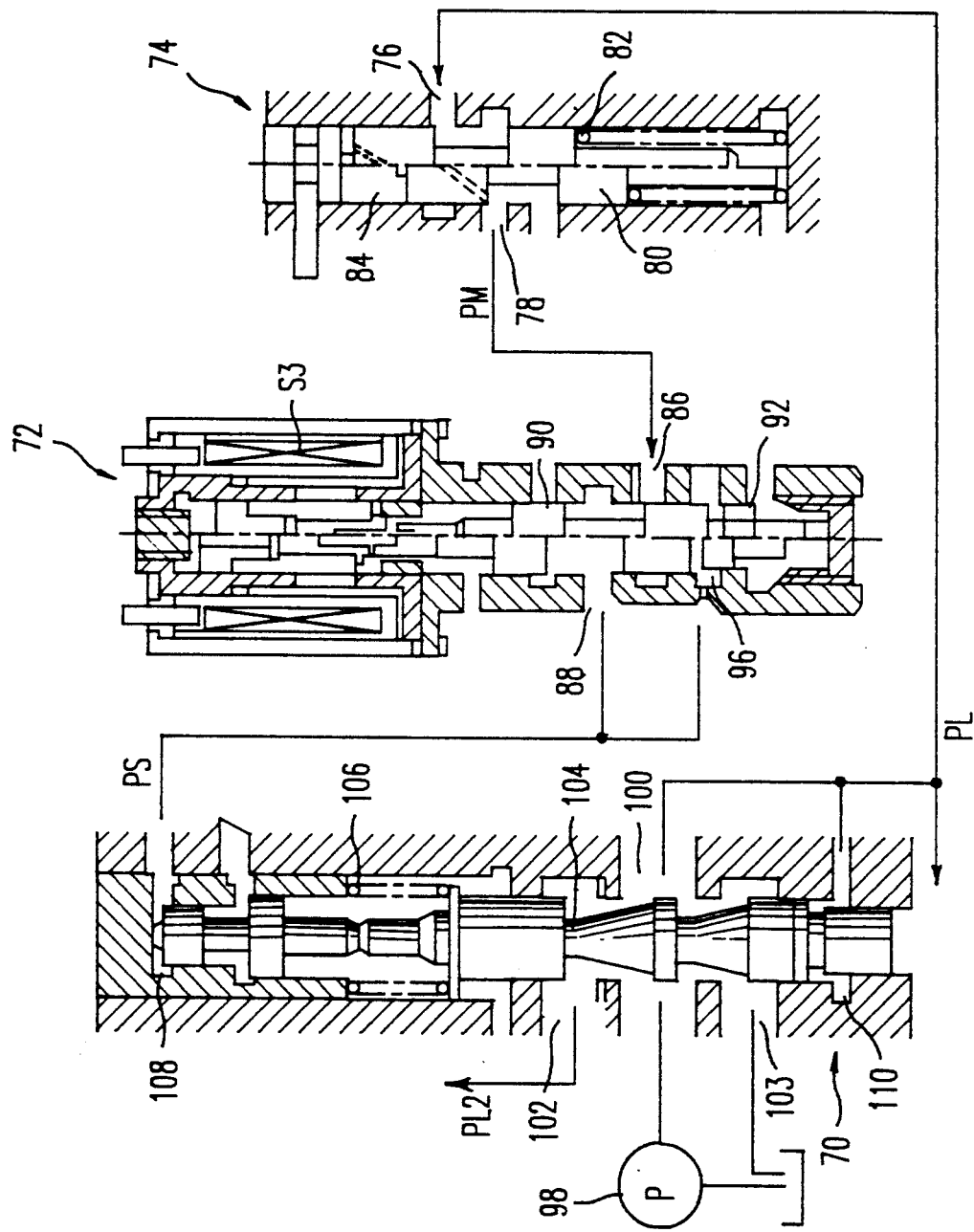
FIG. 3 is a view showing a part of the hydraulic control circuit of the hydraulic control apparatus, which generates and regulates the line pressure.

The hydraulic control circuit 50 incorporates components shown in FIG. 3 adapted to generate and regulate a line pressure PL to be applied to the hydraulic actuators for the frictionally coupling devices in the form of the clutches C and brakes B. Described more specifically, the hydraulic control circuit 50 includes a pressure regulating valve 70, a linear solenoid valve 72 and a modulator valve 74. The modulator valve 74 has: an input port 76 receiving the line pressure PL; an output port 78 from which a modulating pressure PM is generated; a spool 80 movable between an open position for fluid communication between the input and output ports 76, 78, and a closed position for disconnection of the output port 78 from the input port 76; a spring 82 for biasing the spool 80 toward the open position; and a fluid chamber 84 receiving the modulating pressure PM to bias the spool 80 toward the closed position. The modulating pressure PM, which is applied to the linear solenoid valve 72, does not vary with a change in the line pressure PL.

The linear solenoid valve 72 has: an input port 86 receiving the modulating pressure PM; an output port 88 from which a pilot pressure PS is generated; a spool 90 movable between an open position for fluid communication between the input and output ports 86, 88, and a closed position for disconnection of the output port 88 from the input port 86; a spring 92 for biasing the spool 90 toward the closed position; a linear solenoid coil S3 (also indicated in FIG. 1) for magnetically biasing the spool 90 toward the open position; and a fluid chamber 96 receiving the pilot pressure PS to bias the spool 90 toward the closed position. The pilot pressure PS, which is applied to the pressure regulating valve 70, continuously varies with a energizing current SA which is applied to the linear solenoid coil S3, from a controller 52 as indicated in FIG. 1.

The pressure regulating valve 70 has: a line pressure port 100 receiving a pressurized fluid from a hydraulic pump 98; a second line pressure port 102 from which a second line pressure PL2 is generated; a drain port 103 connected to a drain line; a spool 104 movable between an open position and a closed position for controlled fluid communication between the port 100 and the ports 102, 103; a spring 106 for biasing the spool 104 toward the open position; a fluid chamber 108 receiving the pilot pressure PS to bias the spool 104 toward the open; and a feedback fluid chamber 110 receiving the line pressure PL to bias the spool 104 toward the closed position. The second line pressure PL2 generated from the port 102 is lower than the line pressure PL applied to the pont 100. The pressure regulating valve 70 is operated to regulate the line pressure PL depending upon the pilot pressure PS received by the fluid chamber 108.

The energizing current SA is controlled by the controller 52 such that the current SA is decreased to lower the pilot pressure PS for thereby increasing the line pressure PL. The second line pressure PL2 is fed to a lock-up relay valve for a lock-up clutch incorporated in the torque converter 10, a secondary pressure regulating valve, etc.

The controller 52 is constituted by a microcomputer which has a central processing unit (CPU), a random-access memory (RAM), and a read-only memory (ROM), as well known in the art. The controller 52 performs various data processing operations, according to control programs stored in the ROM, while utilizing a temporary data storage function of the RAM, for energizing and de-energizing the solenoid coils S1, S2 and controlling the energizing current SA to be applied to the linear solenoid coil S3. The controller 52 receives various signals such as: THROTTLE signal STA from a throttle sensor 54, which represents an opening angle TA of a throttle valve which controls the intake air quantity of the engine 16; INTAKE AIR QUANTITY signal SQm from an air flow meter 56, which represents the intake air quantity Qm of the engine 16; ENGINE SPEED signal SNE from an engine speed sensor 58, which represents a speed NE of the engine 16; and VEHICLE SPEED signal SV from a vehicle speed sensor 60, which represents a speed of the output shaft 46, and therefore a running speed V of the vehicle. The air flow meter 56 is disposed in an intake pipe of the engine 16, upstream of the throttle valve. The ENGINE SPEED signal SNE of the engine speed sensor 58 is in the form of pulses generated in synchronization with the rotation of the crankshaft 18.

When the shift lever is placed in a DRIVE position (D), for example, the controller 52 determines the operating states of the solenoid coils S1 and S2, according to the throttle opening angle TA represented by the THROTTLE signal STA and the vehicle running speed V represented by the VEHICLE SPEED signal SV, for controlling the automatic transmission 8, so as to select the appropriate one of the four forward drive positions (1st), (2nd), (3rd) and (O/D), according to shift pattern data in the form of shift-up and shift-down boundary maps stored in the ROM. Different sets of shift pattern data may be used selectively depending upon specific running modes of the vehicle selected by the vehicle driver. Further, the shifting of the transmission 8 may be effected depending upon the running conditions of the vehicle, such as braking condition, gradient of the road surface, coolant temperature of the engine 16, acceleration value of the vehicle, and rate of change in the throttle opening angle TA.

The controller 52 also operates to determine the amount of the energizing current SA to be applied to the linear solenoid coil S3, on the basis of the throttle opening angle TA represented by the THROTTLE signal STA, intake air quantity Qm represented by the INTAKE AIR QUANTITY signal SQm, and engine speed NE represented by the ENGINE SPEED signal SNE. The line pressure PL generated by the pressure regulating valve 70 is regulated according to the pilot pressure PS received from the linear solenoid valve 72, which pilot pressure PS changes with a change in the energizing current SA applied to the linear solenoid coil S3. The regulation of the line pressure PL will be described in detail, referring to the flow charts of FIGS. 4 and 5.

The control routine of FIG. 4 is started with step S1 to read in the throttle opening angle TA. Step S1 is followed by steps S2 and S3 to read in the engine speed NE and an estimated intake air quantity QNFWD, respectively. The estimated intake air quantity QNFWD, which corresponds to the load actually applied to the engine 16, is updated with a cycle time of 32 msec., according to a QNFWD calculating routine illustrated in the flow chart of FIG. 5.

Figure 5:
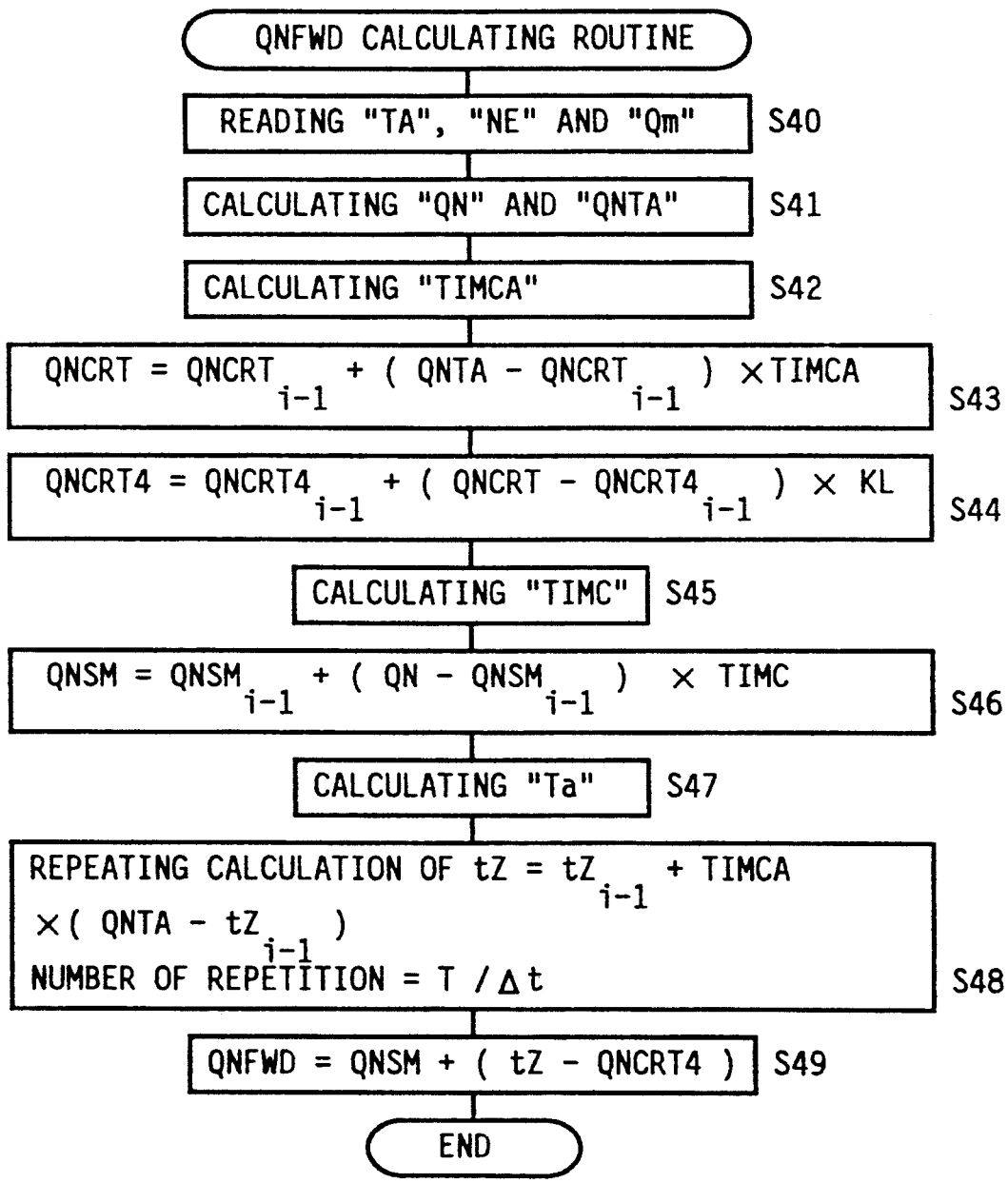
FIG. 5 is a flow chart illustrating a routine for calculating an estimated intake air quantity QNFWD used in step S3 of the control routine of FIG. 4.
Figure 6:
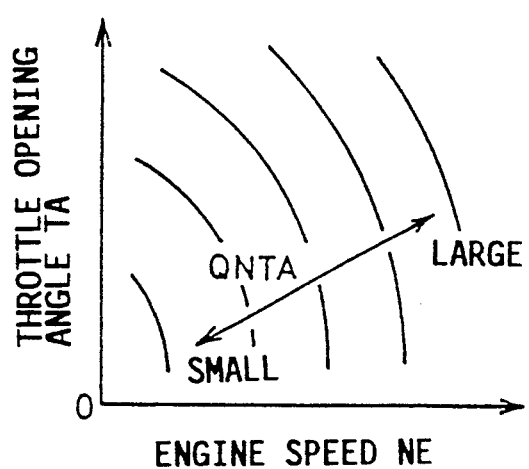
FIG. 6 is a graph illustrating a data map used in steps S4 and S41 of the routines of FIGS. 4 and 5, to calculate a required intake air quantity QNTA.

The QNFWD calculating routine of FIG. 5 is started with step S40 in which the throttle opening angle TA, engine speed NE and intake air quantity Qm are read in. Step S40 is followed by step S41 to calculate an intake air quantity QN per one revolution of the engine 16 (hereinafter referred to simply as "per-revolution intake air quantity QN"), and a required intake air quantity QNTA. The per-revolution intake air quantity QN is obtained by dividing the intake air quantity Qm by the engine speed NE. The required intake air quantity QNTA according to a data map stored in the ROM of the controller 52, based on the throttle opening TA and the engine speed NE which have been read in step S40. As shown in FIG. 6, the data map represents a relationship among the parameters TA, NE and QNTA. In the case where the air flow meter 56 is of a thermal wire type adapted to detect the intake air quantity Qm, the INTAKE AIR QUANTITY signal SQm as received from the air flow meter 56 is used. In the case where the air flow meter 56 is of a movable vane type, the signal SQm is compensated for a variation in the intake air quantity Qm due to the altitude at which the engine 16 operates. This compensation is effected according to an output of an altitude sensor, for example, so that the compensated intake air quantity Qm is that at a nominal altitude slightly higher than the sea level. The data map illustrated in FIG. 6 is formulated to obtain the required intake air quantity QNTA where the vehicle is running at the nominal altitude, and in the predetermined normal operating conditions of the adjusting devices or mechanisms such as the valve timing and idling speed changing mechanisms discussed above.

The control flow then goes to step S42 to calculate a variable TIMCA equivalent to a time constant for the first-order time lag of the output SQm of the air flow meter 56. This variable TIMCA is calculated according a data map stored in the ROM, and on the basis of the engine speed NE and the required intake air quantity QNTA. This data map represents a relationship among the parameters NE, QNTA and TIMCA. The variable TIMCA is smaller than 1. Then, step S43 is implemented to calculate a compensated value QNCRT of the required intake air quantity QNTA, according to the following equation (1):

$$QNCRT = QNCRT_{i-1} + (QNTA - QNCRT_{i-1}) \times TIMCA \qquad (1)$$

In the equation (1), $QNCRT_{i-1}$ represents the compensated value QNCRT obtained in the last calculation cycle (during the last execution of the routine of FIG. 5).

Step S43 is followed by step S44 in which the compensated value QNCRT is processed for another first-order time lag compensation, according to the following equation (2), to calculate a smoothed value QNCRT4 whose response is similar to that of a smoothed value QNSM of the per-revolution intake air quantity QN, which will be described.

$$QNCRT4 = QNCRT4_{i-1} + (QNCRT - QNCRT4_{i-1}) \times KL \qquad (2)$$

In the above equation (2), $QNCRT4_{i-1}$ represents the smoothed value QNCRT4 obtained in the last calculation cycle, and KL is a constant for compensation of the value $QNCRT4_{i-1}$ for a response delay of the air flow meter 56 due to its location upstream of the throttle valve. The constant KL is smaller than 1.

The control flow then goes to step S45 to calculate a variable TIMC (smaller than 1) equivalent to a time constant, on the basis of the engine speed NE and according to a data map stored in the ROM of the controller 52. Step S45 is followed by step S46 to calculate the above-indicated smoothed value QNSM of the per-revolution intake air quantity QN, according to the following equation (3):

$$QNSM = QNSM_{i-1} + (QN - QNSM_{i-1}) \times TIMC \qquad (3)$$

The smoothed value QNSM is compensated by the variable TIMC, to have a response depending upon the engine speed NE. In the above equation (3), $QNSM_{i-1}$ represents the value QNSM obtained in the last calculation cycle.

The control flow then goes to step S47 to calculate a time period Ta between the present moment and the moment at which the intake valve of the engine 16 is closed, i.e., the moment at which the amount of air admitted into the combustion chamber of the engine 16 is fixed. In the next step S48, a smoothed value tZ is repeatedly calculated according to the following equation (4). The number of repetition of the calculation is equal to Ta/Δt, wherein Δt is the cycle time (32 msec. in the present embodiment) of the QNFWD calculating routine of FIG. 5.

$$tZ = tZ_{i-1} + TIMCA \times (QNTA - tZ_{i-1}) \qquad (4)$$

In the above equation (4), $tZ_{i-1}$ represents the smoothed value tZ obtained in the last calculation cycle, and the initial value $tZ_0$ obtained in the first calculation cycle is equal to the compensated value QNCRT.

Step S48 is followed by step S49 to calculate the estimated intake air quantity QNFWD upon closure of the intake valve, according to the following equation (5), which includes the smoothed value tZ obtained by the repeated calculation according to the equation (4) the number of times Ta/Δt.

$$QNFWD = QNSM + (tZ - QNCRT4) \qquad (5)$$

The estimated intake air quantity QNFWD thus calculated based on the detected intake air quantity Qm represents the actual intake air quantity which is estimated to be actually admitted into the cylinder of the engine 16. Although this estimated intake air quantity QNFWD is used in the control routine of FIG. 4 in the present embodiment, the intake air quantity Qm as detected by the air flow meter 56 may be used in place of the estimated intake air quantity QNFWD.

Referring back to the flow chart of FIG. 4, step S3 for calculating the estimated intake air quantity QNFWD is followed by step S4 to calculate the required intake air quantity QNTA in the same manner as in step S41. The control flow then goes to step S5 to determine whether or not the required intake air quantity QNTA is larger than the estimated intake air quantity QNFWD. If the required intake air quantity QNTA is equal to or smaller than the estimated intake air quantity QNFWD, the control flow goes to step S11 in which the estimated intake air quantity QNFWD is used as a pressure control value QNb which is used to regulate the line pressure PL. If the required intake air quantity QNTA is larger than the estimated intake air quantity QNFWD, step S5 is followed by step S6 to read in a rate of change ΔTA in the throttle opening angle TA. This rate of change ΔTA is calculated with the same cycle time (32 msec.) as the QNFWD calculating routine of FIG. 5, and is therefore equal to a difference obtained by subtracting the throttle opening angle $TA_{i-1}$ in the last calculating cycle from the throttle opening angle TA in the present calculating cycle. Step S6 is followed by step S7 to determine whether or not the rate of change ΔTA is lower than a predetermined threshold value α. If the rate of change ΔTA is equal to or higher than the threshold value α, this means that the vehicle is running in a transient state, with the throttle opening angle TA changing relatively rapidly. In this case, step S9 is implemented to reset a timer CDLTA to zero, and step S10 is then implemented to use the required intake air quantity QNTA as the pressure control value QNb for regulating the line pressure PL. If the rate of change Δ→∇ is lower than the threshold value α, step S8 is implemented to determine whether or not the content of the timer CDLTA is smaller than a predetermined threshold value β. If the content of the timer CDLTA is smaller than the threshold value $\beta$, step S10 described above is implemented. If the content of the timer CDLTA is equal to or larger than the threshold value $\beta$, step S11 is implemented to use the estimated intake air quantity QNFWD as the pressure control value QNb, as described above.

Figure 7:
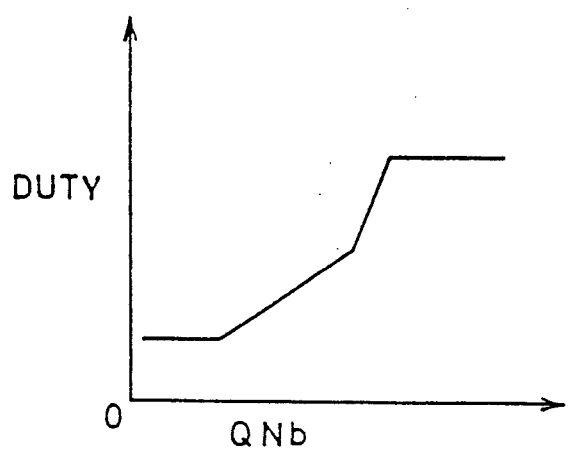
FIG. 7 is a graph indicating a data map used in step S12 of the routine of FIG. 4, to calculate a current control value DUTY for regulating the line pressure.

Step S10 or S11 is followed by step S12 to calculate a current control value DUTY on the basis of the pressure control value QNb, and according to a data map stored in the ROM of the controller 52. The data map represents a relationship between the current control value DUTY and the pressure control value QNb, as indicated in FIG. 7. The average energizing current SA applied to the linear solenoid S3 decreases with an increase in the current control value DUTY, whereby the pilot pressure PS is lowered to accordingly increase the line pressure PL. The relationship of FIG. 7 is determined by experiments, so as to provide the optimum line pressure PL which changes with the pressure control value QNb.

It will be understood from the above explanation that the current control value DUTY which determines the energizing current SA is calculated on the basis of the estimated intake air quantity QNFWD while the estimated intake air quantity QNFWD is equal to or larger than the required intake air quantity QNTA, or while the vehicle is running in a steady state even when the estimated intake air quantity QNFWD is smaller than the required intake air quantity QNTA. The term "steady state" is interpreted to mean a state in which the rate of change $\Delta$TA in the throttle opening angle TA is lower than the threshold value $\alpha$ and in which the content of the timer CDLTA is larger than the threshold value $\beta$. Referring to the uppermost graph of FIG. 8, t1 and t3 represent periods during which the vehicle runs in the steady state. The period t3 begins upon expiration of the time $\beta$ which starts when the rate of change $\Delta$TA exceeds the threshold value $\alpha$, as indicated in the third graph (from the uppermost graph) and as described with respect to steps S7 and S9. Therefore, in the steady running state of the vehicle, the line pressure PL is regulated on the basis of the estimated intake air quantity QNFWD which is obtained on the basis of the actually detected intake air quantity Qm, and which accurately reflects the actual engine load, without being influenced by the altitude or by the operating states of the adjusting mechanisms such as the mechanism for changing the idling speed of the engine 16. Accordingly, the line pressure PL in the steady running state of the vehicle can be regulated to an optimum level which corresponds to the actual engine load, namely, the amount of torque that should be transmitted through the automatic transmission 8.

Figure 8:
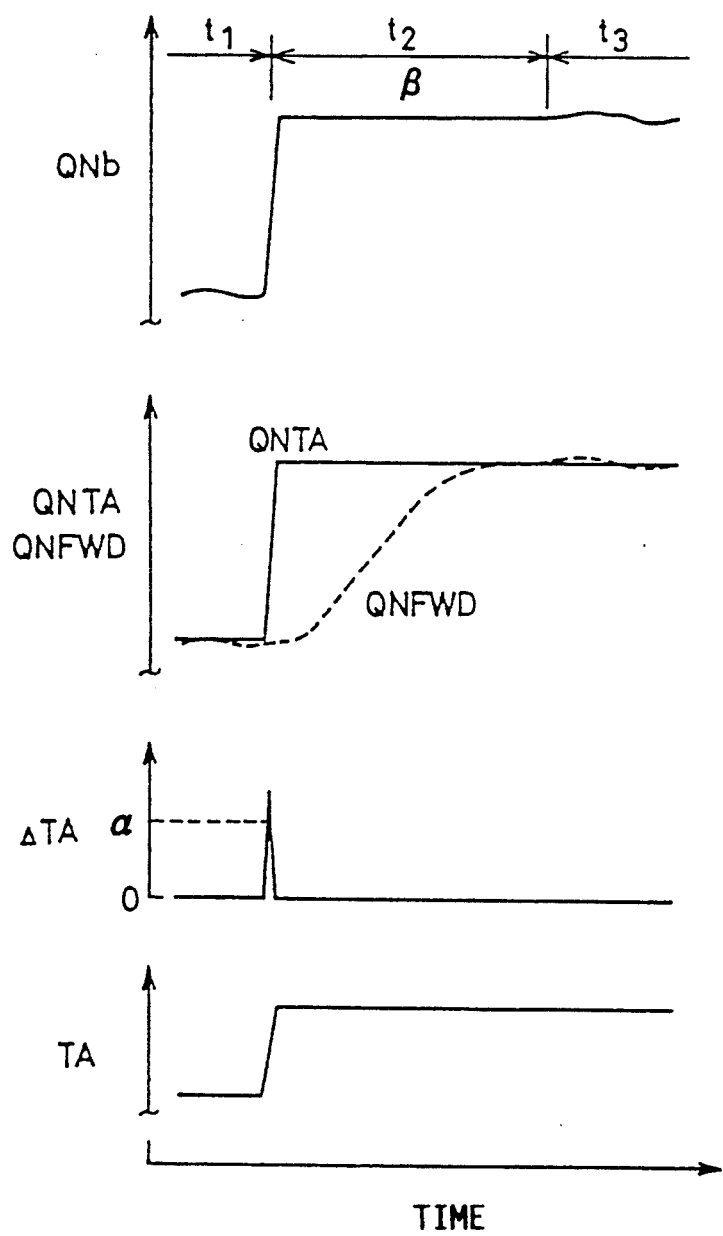
FIG. 8 is a time chart illustrating changes of various parameters including QNb, QNTA and QNFWD.

While the vehicle is running in a transient state, on the other hand, the current control value DUTY is calculated on the basis of the required intake air quantity QNTA which is obtained on the basis of the throttle opening angle TA. The term "transient state" is interpreted to mean a state in which the estimated intake air quantity QNFWD is smaller than the required intake air quantity QNTA and in which the rate of change $\Delta$TA is equal to or higher than the threshold value $\alpha$, or in which the rate of change $\Delta$TA is lower than the threshold value $\alpha$ while the content of the timer CDLTA is smaller than the threshold value $\beta$. In FIG. 8, t2 represents a period during which the vehicle runs in the transient state. The transient period t2 begins when the rate of change $\Delta$TA exceeds the threshold value $\alpha$ and ends when the threshold time $\beta$ expires. Therefore, in the transient running state of the vehicle, the line pressure PL is regulated on the basis of the required intake air quantity QNTA, which is obtained depending upon the throttle opening angle TA. As indicated in the second graph of FIG. 8, the value QNTA changes with a change in the throttle opening angle TA, with a better response, than the value QNFWD, whereby the line pressure PL can be rapidly increased before the torque applied to the transmission 8 is increased due to an increase in the actual output of the engine 16, when the throttle opening angle TA is abruptly increased as indicted in the lowermost graph of FIG. 8.

The threshold value $\beta$ used in step S8 is determined to be a time duration necessary for the estimated intake air quantity QNFWD to rise up to the level of the required intake air quantity QNTA, as indicated in dashed line in the second graph of FIG. 8, when the throttle opening angle TA is increased. However, even before the content of the timer CDLTA reaches the threshold value $\beta$, the line pressure PL is regulated on the basis of the estimated intake air quantity QNFWD, if the estimated intake air quantity QNFWD is equal to or larger than the required intake air quantity QNTA, because a negative decision (NO) is obtained in step S5 and step S11 is implemented as described above. The threshold value $\alpha$ used in step S7 is determined to be an upper limit of the rate of change $\Delta$TA above which the line pressure PL is lower than required, due to the response delay of the estimated intake air quantity QNFWD with respect to a change in the throttle opening TA.

As discussed above, the present hydraulic control apparatus for the automatic transmission 8 is adapted to regulate the line pressure PL on the basis of the estimated intake air quantity QNFWD which accurately reflects the actual load of the engine 16, while the vehicle is running in the steady state as defined above. This arrangement permits the line pressure PL to be suitably regulated depending upon the actual engine torque, namely, the amount of torque that should be transmitted through the transmission 8, since the intake air quantity Qm from which the estimated intake air quantity QNFWD is obtained is not influenced by the altitude, or the operating states of the adjusting mechanisms such as the mechanism for changing the idling speed of the engine 16. While the vehicle is running in the transient state as defined above, the line pressure is regulated on the basis of the required intake air quantity QNTA which is obtained depending upon the throttle opening angle TA, which changes before the torque applied to the transmission 8 changes. This arrangement permits the line pressure PL to be rapidly increased before the torque actually increases due to an increase in the throttle opening angle TA.

In the present embodiment, the throttle sensor 54 serves as means for detecting the opening angle TA of the throttle valve of the engine 16, while the air flow meter 56 serves as means for detecting the intake air quantity Qm of the engine 16. Further, the portions of the controller 52 assigned to implement steps S5–S9 function as means for determining whether the vehicle is running in the transient state or in the steady state, and the portions of the controller 52 assigned to implement steps S10–S12 and the linear solenoid valve 72 and the pressure regulating valve 70 constitute means for regulating the line pressure PL to be applied to the actuators for the clutches C and brakes B.

While the present invention has been described in detail in its presently preferred embodiment by reference to the accompanying drawings, it is to be understood that the invention may be otherwise embodied.

In the illustrated embodiment, the line pressure PL is regulated on the basis of the required intake air quantity QNTA and the estimated intake air quantity QNFWD. However, the estimated intake air quantity QNFWD may be replaced by the per-revolution intake air quantity QN (=Qm/NE). Further, the manner of calculating the estimated intake air quantity QNFWD as described by reference to the flow chart of FIG. 5 may be suitably modified. The intake air quantity Qm may be obtained on the basis of the pressure in the intake pipe, and the throttle opening angle TA may be replaced by the operating amount of an accelerator pedal of the vehicle.

While the illustrated embodiment is adapted to use only the pressure control value QNb for determining the line pressure PL, the other parameter or parameters may be used to determine the line pressure PL. The illustrated control apparatus may be adapted to change the line pressure PL temporarily during given periods, for example, when the automatic transmission 8 are shifted from one position to another.

Although the pressure regulating valve 70 and the linear solenoid valve 72 is used to regulate the line pressure PL, the line pressure may be regulated by other means such as a variable delivery pump provided in place of the pump 98.

In the illustrated embodiment, the rate of change ΔTA in the throttle opening angle TA is used to determine the transient running state of the vehicle, the rate of change ΔTA may be replaced by a rate of change ΔQN in the per-revolution intake air quantity QN, a rate of change ΔQNTA in the required intake air quantity QNTA, a rate of change ΔQNFWD in the estimated intake air quantity QNFWD, or a rate of change in the other parameter. Further, the determination of the steady state after the transient state may be made depending upon whether a difference between the quantities QNFWD and QNTA is smaller than a predetermined threshold.

It is to be understood that the present invention may be embodied with various other changes, modifications and improvements, which may occur to those skilled in the art, without departing from the spirit and scope of the invention defined in the following claims.

What is claimed is:

1. A hydraulic control apparatus for an automatic transmission of a motor vehicle with an engine having a throttle valve, said transmission including a plurality of hydraulically operated frictional coupling devices which are selectively operated to establish one of a plurality of operating positions of the transmission, said apparatus comprising:

pressure source for generating a hydraulic pressure;
first detecting means for detecting an opening angle of said throttle valve;
second detecting means for detecting an intake air quantity admitted into said engine;
determining means for determining whether the vehicle is running in a steady state or in a transient state; and
pressure regulating means receiving said hydraulic pressure and generating a line pressure to be applied to said frictional coupling devices, said pressure regulating means regulating said line pressure on the basis of said opening angle of the throttle valve when said determining means determines that the vehicle is running in said transient state, and on the basis of said intake air quantity when said determining means determines that the vehicle is running in said steady state.

2. An apparatus according to claim 1, wherein said determining means further comprises means for ascertaining whether or not a rate of change in said opening angle of the throttle valve is lower than a predetermined threshold value, said determining means determines that the vehicle is running in said steady state, when said rate of change in said opening angle of the throttle valve is lower than said predetermined threshold value, and determines that the vehicle is running in said transient state, when said rate of change is not lower than said predetermined threshold value.

3. An apparatus according to claim 1, wherein said determining means further comprises means for ascertaining whether a predetermined time has elapsed after said rate of change in said opening angle of the throttle valve has reached said predetermined threshold value, said determining means determines that the vehicle is running in said steady state, when said predetermined time has elapsed while said rate of change in said opening angle is lower than said predetermined threshold value.

4. An apparatus according to claim 1, further comprising:

third detecting means for detecting a rotating speed of said engine;
first calculating means for calculating a required intake air quantity on the basis of said opening angle of the throttle valve detected by said first detecting means and said rotating speed of the engine detected by said third detecting means; and
second calculating means for calculating an estimated intake air quantity on the basis of said intake air quantity of the engine detected by said second detecting means,
and wherein said pressure regulating means regulates said line pressure on the basis of said required intake air quantity when said vehicle is running in said transient state, and on the basis of said estimated intake air quantity when said vehicle is running in said steady state.

5. An apparatus according to claim 4, wherein said second calculating means calculates said estimated intake air quantity on the basis of a per-revolution intake air quantity of said engine by dividing said intake air quantity detected by said second detecting means by said rotating speed of the engine detected by said third detecting means.

6. An apparatus according to claim 5, wherein said second calculating means calculates said estimated intake air quantity on the basis of a variable equivalent to a time constant for compensation of said intake air quantity for a response delay of said second detecting means with respect to said first detecting means, as well as on the basis of said intake air quantity.

7. An apparatus according to claim 1, wherein said pressure regulating means comprises:

a solenoid-operated valve which generates a pilot pressure and which includes a solenoid coil, said solenoid-operated valve operating such that said pilot pressure changes with an energizing current applied to said solenoid coil;

a pressure regulating valve which receives said hydraulic pressure generated by said pressure source and said pilot pressure generated by said solenoid-operated valve, said pressure regulating valve operating to change said line pressure with said pilot pressure; and control means for controlling an amount of said energizing current, on the basis of said opening angle of the throttle valve when the vehicle is running in said transient state, and on the basis of said intake air quantity when the vehicle is running in said steady state.

* * * * *